(12) United States Patent
Sanzgiri et al.

(10) Patent No.: US 11,580,220 B2
(45) Date of Patent: Feb. 14, 2023

(54) METHODS AND APPARATUS FOR UNKNOWN SAMPLE CLASSIFICATION USING AGGLOMERATIVE CLUSTERING

(71) Applicant: McAfee, LLC, Santa Clara, CA (US)

(72) Inventors: Ameya Sanzgiri, Santa Clara, CA (US); German Lancioni, Santa Clara, CA (US)

(73) Assignee: MCAFEE, LLC, San Jose, CA (US)

( * ) Notice: Subject to any disclaimer, the term of this patent is extended or adjusted under 35 U.S.C. 154(b) by 470 days.

(21) Appl. No.: 16/863,494

(22) Filed: Apr. 30, 2020

(65) Prior Publication Data

US 2021/0342447 A1 Nov. 4, 2021

(51) Int. Cl.
*G06F 21/00* (2013.01)
*G06F 21/56* (2013.01)
(Continued)

(52) U.S. Cl.
CPC .......... *G06F 21/564* (2013.01); *G06F 40/284* (2020.01); *G06K 9/6218* (2013.01);
(Continued)

(58) Field of Classification Search
CPC ... G06F 21/564; G06F 40/284; G06K 9/6218; G06K 9/6267; H04L 63/1441; H04L 63/145
See application file for complete search history.

(56) References Cited

U.S. PATENT DOCUMENTS 9,166,994 B2 * 10/2015 Ward ................... H04L 63/1425
9,680,861 B2 * 6/2017 Ward ................... H04L 63/1441
(Continued)

OTHER PUBLICATIONS

Roseline, S. Abijah; Geetha, S. Intelligent Malware Detection using Oblique Random Forest Paradigm. 2018 International Conference on Advances in Computing, Communications and Informatics (ICACCI). https://ieeexplore.ieee.org/stamp/stamp.jsp?tp=&arnumber=8554903 (Year: 2018).*

(Continued)

*Primary Examiner* — Jeremiah L Avery
(74) *Attorney, Agent, or Firm* — Hanley, Flight & Zimmerman, LLC

(57) ABSTRACT

Methods, apparatus, systems and articles of manufacture are disclosed for classification of unknown samples using agglomerative clustering. An apparatus includes an extractor to extract a feature from a sample source code, the feature including at least one of a register, a variable, or a library based on a threshold of occurrence in a corpus of samples, the corpus of samples including malware samples, a dendrogram generator to generate a dendrogram based on features extracted from the sample source code, the dendrogram representing a collection of samples clustered based on similarity among the samples, the samples including sample clusters belonging to known malware families, and an anchor point identifier to traverse the dendrogram to identify similarity of an unknown sample to the sample clusters based on a confidence score, and identify anchor point samples from the sample clusters identified as similar to the unknown sample, the anchor point samples to provide metadata for use in extrapolating information to classify the unknown sample.

20 Claims, 11 Drawing Sheets

(51) Int. Cl.
    *G06K 9/62* (2022.01)
    *G06F 40/284* (2020.01)
    *H04L 9/40* (2022.01)
(52) U.S. Cl.
    CPC ........ *G06K 9/6267* (2013.01); *H04L 63/1441* (2013.01); *H04L 63/145* (2013.01)

(56) References Cited

U.S. PATENT DOCUMENTS

| | | | |
|---|---|---|---|
| 9,894,088 B2 * | 2/2018 | Ward | H04L 63/1425 |
| 10,084,806 B2 * | 9/2018 | Ward | H04L 63/1433 |
| 2022/0305735 A1 * | 9/2022 | Cella | H04L 9/50 |

OTHER PUBLICATIONS

Angelini, Marco et al. The goods, the bads and the uglies: Supporting decisions in malware detection through visual analytics. 2017 IEEE Symposium on Visualization for Cyber Security (VizSec). https://ieeexplore.ieee.org/stamp/stamp.jsp?tp=&arnumber=8062199 (Year: 2017).*

* cited by examiner

700

| 710 | Stub Code from Decompiled Application | iget v3, p0, Lcom/sprdbrig/egetcka/csmdotg :-> d:l<br>invoke-virtual {p0, v9, v3} , Lcom/sprdbrig/egetcka/csmdotg ;-) a(lll)V<br>iget- object v3, p0, Lcom/sprdbrig/egetcka/csmdotg; -> j: [l<br>invoke-virtual v7, p2, Lcom/game/ads/testlab<br>Iget- object v5,p1, Lcom/android/java/common;-> k: [A<br>:goto_1c8<br>Add-int/ lit8 v4,v0,0x15 |
|---|---|---|
| 720 | After Removing Candidate Registers/ Variables | Iget Lcom/sprdbrig/egetcka/csmdotg Lcom/sprdbrig/egetcka/csmdotg<br>invoke-virtual Lcom/sprdbrig/egetcka/csmdotg<br>iget- object Lcom/sprdbrig/egetcka/csmdotg<br>invoke-virtual Lcom/game/ads/testlab<br>iget- object Lcom/android/java/ |
| 730 | After Removing Common Libraries | Iget Lcom/sprdbrig/egetcka/csmdotg Lcom/sprdbrig/egetcka/csmdotg<br>invoke-virtual Lcom/sprdbrig/egetcka/csmdotg<br>iget- object Lcom/sprdbrig/egetcka/csmdotg<br>invoke-virtual<br>iget- object |
| 740 | Tokenized (Grammar) | Iget Lcomsprdbrigegetckacsmdotg Lcomsprdbrigegetckacsmdotg<br>invoke-virtual Lcomsprdbrigegetckacsmdotg<br>iget- object Lcomsprdbrigegetckacsmdotg<br>invoke-virtual<br>iget- object |
| 750 | Bi-grams (Vocabulary) | Iget Lcomsprdbrigegetckacsmdotg, Lcomsprdbrigegetckacsmdotg<br>    Lcomsprdbrigegetckacsmdotg, Lcomsprdbrigegetckacsmdotg<br>invoke-virtual, invoke-virtual Lcomsprdbrigegetckacsmdotg,<br>    Lcomsprdbrigegetckacsmdotg<br>iget- object, iget- object Lcomsprdbrigegetckacsmdotg,<br>    Lcomsprdbrigegetckacsmdotg<br>invoke-virtual, invoke-virtual iget- object, iget- object |

FIG. 7

METHODS AND APPARATUS FOR UNKNOWN SAMPLE CLASSIFICATION USING AGGLOMERATIVE CLUSTERING

FIELD OF THE DISCLOSURE

This disclosure relates generally to malware, and, more particularly, to methods and apparatus for unknown sample classification using agglomerative clustering.

BACKGROUND

Malware (e.g., viruses, worms, trojans, ransomware) is malicious software disseminated by attackers to launch a wide range of security attacks, such as stealing users' private information, hijacking devices remotely to deliver massive spam emails, infiltrating a users' online account credentials, etc. The introduction of malware to a computing system may cause serious damages to computer equipment and/or data and/or may cause significant financial loss to Internet users and/or corporations.

BRIEF DESCRIPTION OF THE DRAWINGS

FIG. 7 illustrates an example process of building a sample's vocabulary from decompiled software code, in accordance with the flowcharts of FIGS. 3 and/or 4.

Figure 1:
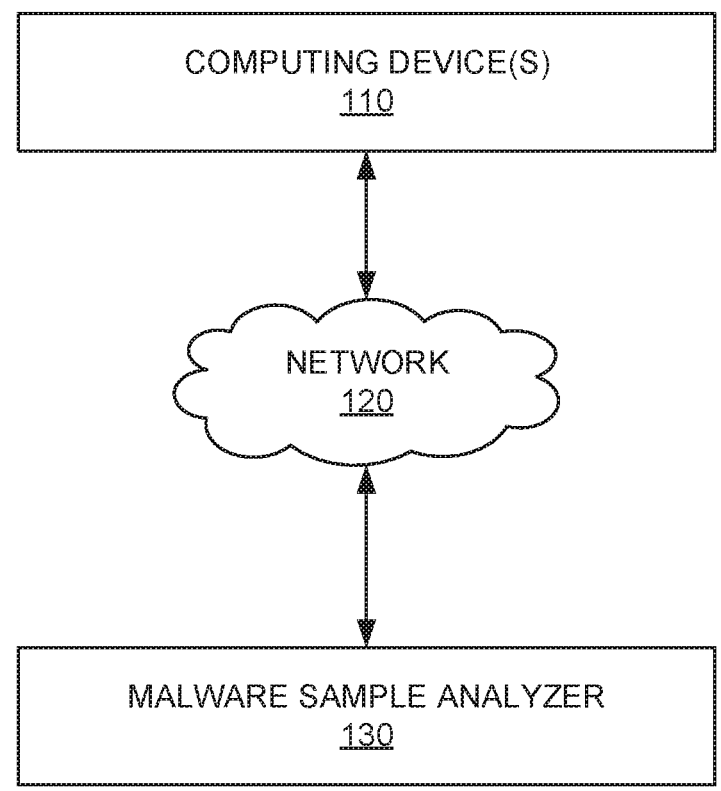
FIG. 1 illustrates an example environment in which computer and/or mobile software is screened to determine presence of malware in accordance with teachings disclosed herein.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Computing system security depends on the identification and elimination of malicious software. Malware has a wide range of forms and variations (e.g., viruses, worms, rootkits, botnets, Trojan horses, etc.) that exploit software vulnerabilities in browsers and operating systems in order to spread, resulting in the launching of distributed denial of service attacks (DDoS), collection of classified information, and other activities that compromise privacy and security. Thousands of malware samples are received every day via a malware research pipeline for analysis by security researchers. For example, such samples can originate from users submitting suspicious code on their operating systems or through sample collection by anti-malware companies. Malware assessment permits identification of detection signatures and removal procedures, thereby requiring an understanding of the type and severity of a given malware sample. Likewise, it is useful to recognize whether a sample is a variant of an existing malware family or belongs to a previously unidentified malware family. For example, malware authors can use obfuscations and polymorphisms to change a malware's signature to avoid detection by anti-virus software, which uses signature-based detection solutions created to recognize a file as malicious. Once a sample is collected, it can be analyzed to determine a signature or behavior that is always present in the malware, allowing the identification of malware families.

As such, when new samples (e.g., applications) are submitted into a malware research pipeline for analysis, those samples that are classified as known malware samples can be filtered out, with remaining samples remaining unidentified (e.g., unknown). Such unknown samples can be variants of existing malware, new malware families, or benign (e.g., clean) samples. However, the analysis to classify the unknown sample into these three categories is a time-intensive process that can result in the malware research pipeline backlogs that are progressively difficult to clear. For example, current techniques of malware sample assessment include manual analysis and use of third-party scan information, with security researchers assessing all the unknown samples individually in order to categorize them as part of an existing malware family, a new malware variant, or a clean sample. In the context of mobile malware, up to 6,500 applications a week may need to be processed and categorized. Categorization of new samples as part of the manual processing of unknown samples is therefore largely dependent on security researcher experience, which is subject to inherent bias and ambiguities involved with defining malware variants and identifying new families. Furthermore, training of a machine learning algorithm to automate the process of classifying unknown malware samples requires the use of accurate training data. Accuracy of unknown sample classification is therefore important for effectively identifying malicious software and creating an autonomous sample classification process.

Examples disclosed herein use agglomerative clustering to aid security researchers with the classification of unknown samples. Disclosed examples provide a mechanism to narrow down the number of unknown samples a security researcher must analyze. For example, methods and apparatus disclosed herein permit the identification of malware that is being revived by determining how many samples are close to known/classified malware families based on a dendrogram generated using agglomerative clustering. For example, the generated dendrogram provides anchor-point samples for comparison to determine whether an unknown sample is close to an existing anchor-point (e.g., a variant of existing malware) or not close to any existing anchor-points (e.g., part of a new malware family). Furthermore, a confidence score can be used to determine whether the unknown sample can be classified as a clean sample, indicating that it is not related to any known malware variants nor is it likely to be part of a new malware family. A dendrogram generated using agglomerative clustering thereby allows security researchers to determine whether a malware campaign is being revived, identify new malware families, or classify an unknown sample as a benign threat. Additionally, the proximity of new samples to a number of anchor-points on the dendrogram that belong to two different malware families or variants can trigger an audit and/or re-evaluation of the anchor-points, such that the dendrogram is continuously evolving and improves in accuracy over time as more samples are added.

FIG. 1 illustrates an example environment 100 in which computer and/or mobile software is screened to determine presence of malware in accordance with teachings disclosed herein. The environment 100 includes example computing device(s) 110, an example network 120, and an example malware sample analyzer 130.

In the example of FIG. 1, computing device(s) 110 can implement a workstation, a personal computer, a tablet computer, a smartphone, a laptop, and/or any other type of computing device that uses computer and/or mobile software (e.g., applications). The computing device(s) 110 may host applications used in receiving and sending electronic communications. For example, the computing device(s) 110 may host applications such as a messaging application, a phone call application, social media applications (e.g., Twitter, Facebook, Instagram, etc.), an email application, a browser application, and/or instant messaging applications (e.g., Skype). However, other applications may additionally and/or alternatively be included on the computing device(s) 110. The computing device(s) 110 can communicate with other devices on the network 120 via a wireless and/or wired connection. The computing device(s) 110 can include a communication interface that allows for the submission of potential malware samples (e.g., samples to be assessed to determine the presence of malicious software) to the malware sample analyzer 130 via the network 120. For example, the malware samples can originate from malware such as computer viruses, computer worms, trojan viruses, rootkits, adware, spyware, bots, file-less malware, ransomware, ghost mining, and/or any other type of malicious software, code, programs, etc. In some examples, the potential malware samples are provided to the malware sample analyzer 130 via an installed anti-virus program that detects and isolates malware samples that are sent to the malware sample analyzer 130 for further assessment and classification (e.g., part of a known malware family, part of a new malware family, clean sample, etc.). However, any other method of transmitting a potential malware sample from the computing device(s) 110 to the malware sample analyzer 130 via the network 120 can be used.

In some examples, the communication interface used to transmit a potential malware sample from the computing device(s) 110 to the malware sample analyzer 130 is wired (e.g., an Ethernet connection). In other examples, the communication interface is wireless (e.g., a WLAN, a cellular network, etc.). However, any other method and/or system of communication may additionally or alternatively be used such as, for example, a Bluetooth connection, a Wi-Fi connection, etc. In some examples, the wireless communication between the computing device(s) 110 and the malware sample analyzer 130 can be implemented using a cellular connection via a Global System for Mobile Communications (GSM) connection. However, any other systems and/or protocols for communications may be used such as, for example, Time Division Multiple Access (TDMA), Code Division Multiple Access (CDMA), Worldwide Interoperability for Microwave Access (WiMAX), Long Term Evolution (LTE), etc.

In the example of FIG. 1, the network 120 may be implemented using any type of public or private network including the Internet, a telephone network, a local area network (LAN), a cable network, and/or a wireless network. As used herein, the phrase "in communication," including variances thereof, encompasses direct communication and/or indirect communication through one or more intermediary components and does not require direct physical (e.g., wired) communication and/or constant communication, but rather additionally includes selective communication at periodic or aperiodic intervals, as well as one-time events.

In the example of FIG. 1, the malware sample analyzer 130 is used to aid in the assessment of potential malware samples that are not automatically identified as definitively belonging to a specific malware family. In the examples disclosed herein, the malware sample analyzer 130 generates a dendrogram using agglomerative clustering based on existing known samples, as described in connection with FIGS. 2-6. Any sample received from the computing device(s) 110 that is determined to be unknown (e.g., not definitively identified to be part of a specific malware family) can be assessed using the dendrogram to determine whether the unknown sample is (1) a variant of a known malware family, (2) part of a new malware family, or (3) clean and/or benign. The malware analyzer 130 can decompile a sample (e.g., Android application package (APK), etc.) and extract code features used to determine the sample's similarity and/or dissimilarity to other samples. The malware sample analyzer 130 is compatible with malware samples associated with any operating system (e.g., Windows®, macOS®, Linux®, etc.) and/or any type of code, including a non-executable source code programming language (e.g., pre-compiled programming languages, C, C+, C#, etc.), an executable source code programming language (e.g., Java, Swift, Python, etc.) and/or executable object code (e.g., compiled binary code, portable executable files, complied executable object code, etc.). In some examples, samples obtained during samples collection on the computing device(s) 110 are initially be compared to existing white lists to determine any matching indicating that the sample is a benign file (e.g., goodware) that can be removed from further analysis.

In some examples, the malware sample analyzer 130 receives samples based on identification efforts of an incident responder or forensic analyst during a network intrusion analysis, allowing malicious code to be identified and isolated. For example, malicious code infection indicators that prompt malware sample collection can include high bandwidth usage, remote connections, communication on known malicious ports, and communication links to Uniform Resource Locations (URLs) on known malware domain lists. In some examples, the malware sample analyzer 130 receives samples from virus and/or malware scanners (e.g., installed on computing device(s) 110). Such virus and/or malware scanners can include endpoint scanners, mail filters, gateways, firewalls, web application filters, or any other program that can collect suspicious samples during operation. For example, virus and/or malware scanners can delete, isolate, and/or quarantine code that matches their existing signature database. However, malware authors can use obfuscations and polymorphisms to change a malware's signature to avoid detection by the anti-virus software. As such, the malware sample analyzer 130 can receive unknown samples for further assessment, while also receiving any known malware samples to use in the generation of a dendrogram using agglomerative clustering, as described in connection with FIGS. 2-6. Using the malware sample analyzer 130, an examination of taxonomic and phylogenetic relationships (e.g., based on the generated dendrogram) among malware specimens can be performed to classify an unknown sample to determine if, for example, it belongs to a particular malware family. The malware sample analyzer can be implemented in and/or by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)).

Figure 2:
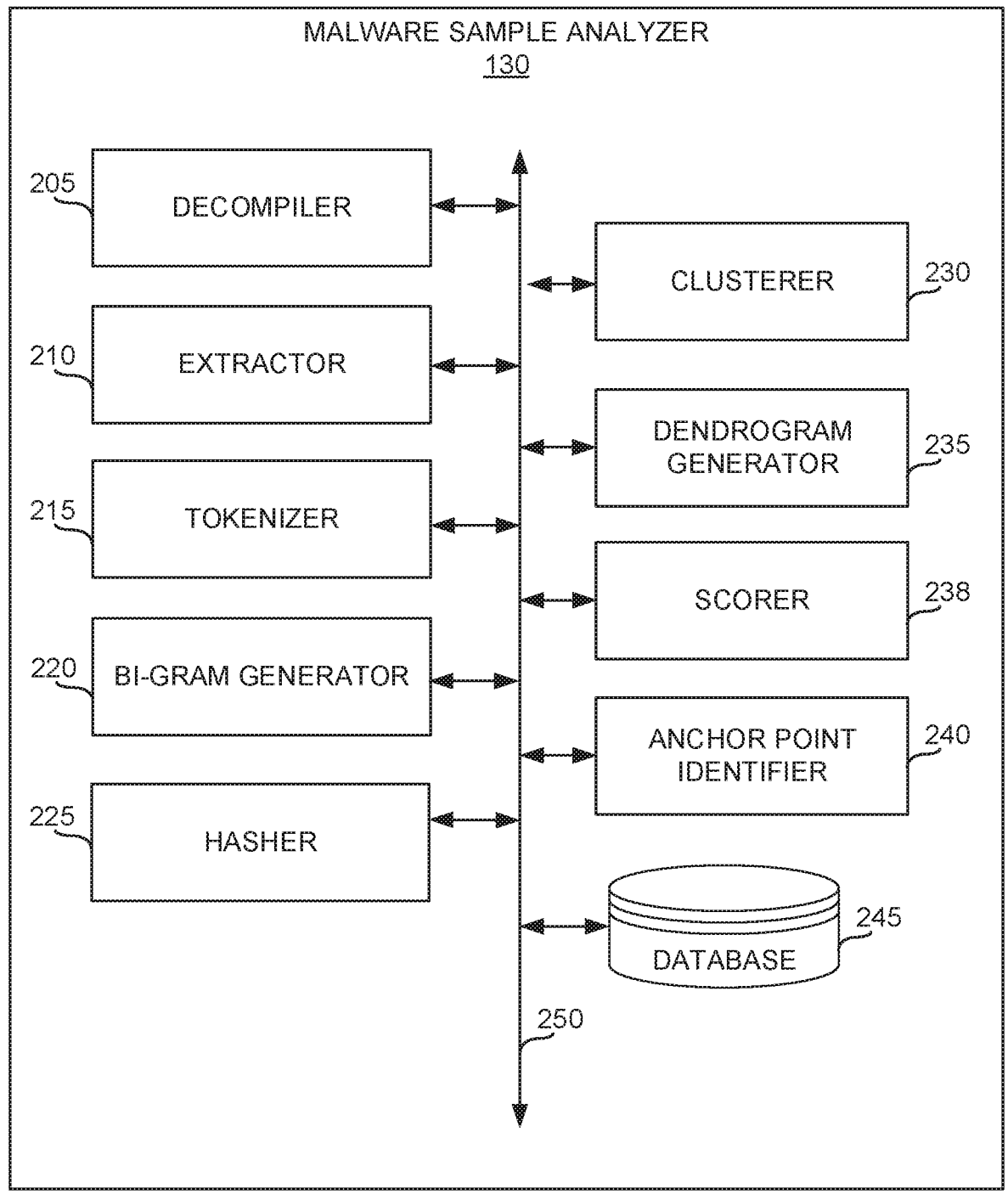
FIG. 2 is a block diagram representative of an example malware sample analyzer that may be implemented in the example environment of FIG. 1.

FIG. 2 is a block diagram representative of the malware sample analyzer 130 that may be implemented in the example environment of FIG. 1. The malware sample analyzer 130 includes an example decompiler 205, an example extractor 210, an example tokenizer 215, an example bi-gram generator 220, an example hasher 225, an example clusterer 230, an example dendrogram generator 235, an example scorer 238, an example anchor point identifier 240, and an example database 245. In the example of FIG. 2, any of the decompiler 205, the extractor 210, the tokenizer 215, the bi-gram generator 220, the hasher 225, the clusterer 230, the dendrogram generator 235, the scorer 238, the anchor point identifier 240, and/or the database 245 may communicate via an example communication bus 250. In examples disclosed herein, the communication bus 250 may be implemented using any suitable wired and/or wireless communication.

The decompiler 205 decompiles samples (e.g., Android applications) that are received by the malware sample analyzer 130 of FIG. 1. The samples to decompile can include samples that are known malware samples or unknown malware samples (e.g., samples that cannot be identified as malware with a high level of confidence and thereby require further assessment and/or classification). The decompiler 205 decompiles an application by providing a source code that mimics the functionality of the byte code. For example, the decompiler 205 translates the application assembly code (e.g., from an .exe file) to source code (e.g., high-level programming language such as C, C++, Java, etc.). Given that the decompiler 205 performs the reverse operation of a compiler, low-level assembly representation of a binary file can be translated into a higher-level abstraction (e.g., allow the code to be human-readable), as discussed in connection with FIG. 7, which shows an example stub code from a decompiled application.

The extractor 210 extracts intermediate code from the application code decompiled by the decompiler 205 as part of creating human-readable high-level source code. The extractor 210 strips registers, variables, and/or libraries from the intermediate code by removing highly prevalent features (e.g., registers, variables, and/or libraries seen in over 90% of the corpus) and/or features that are sparsely used (e.g., registers, variables, and/or libraries seen in less than 90% of the corpus) to reduce model complexity. As such, the extractor 210 can use a threshold of occurrence to determine which features appear most frequently and least frequently among the samples. The extractor 210 can also be used to extract application metadata (i.e., name of the developer, category, number of downloads, etc.) to provide additional information identifying similarity and/or dissimilarity among known and unknown malware samples. For example, the extraction of metadata from samples provides an indication of whether the application shows malware patterns, which can also be identified based on information related to run-time parameters (e.g., CPU usage, network transmission, process and memory information, etc.). In some examples, the extracted metadata depends on the type of application sample being processed (e.g., Android-based applications can provide information about application developers, certification information of the application signature such as issuer or expiration dates, intents, permissions, general file information, etc.).

The example tokenizer 215 tokenizes the code remaining after the decompiler 205 and/or extractor 210 has decompiled the application and removed candidate registers and/or variables, including common libraries. Tokenizing the code results in the grammar of the application that defines the core functionality of the application. For example, the tokenizer 215 provides a lexical scanner for the source code, such that input code is converted into an array of tokens (e.g., splitting the source code into meaningful units), as described in connection with FIG. 7.

The example bi-gram generator 220 generates a bi-gram representing a sequence of two adjacent elements from a string of tokens generated using the tokenizer 215. In some examples, the bi-gram generator 220 generates an n number of gram (e.g., n-grams), which is a contiguous sequence of n items from the tokenized code. The choice of the n-gram can depend on the target operating system and programming language specifics and characteristics. For example, a bi-gram can be used for an Android operating system using Java. However, other n-grams can be used for updated versions of the operating system that allow the system to support additional programming languages (i.e., Kotlin). In some examples, n is a fixed number that is dependent on the corpus of samples and the queries made against that corpus. For example, the generated bi-grams are used to identify distance metrics between samples to determine similar categories when using clustering to sort the sample data (e.g., grouping the samples such that samples in the same group are more similar to each other than samples in other groups).

The example hasher 225 performs feature hashing of the bi-grams formed using the bi-gram generator 220. The hasher 225 vectorizes features (e.g., turns arbitrary features into indices in a vector or matrix). For example, the hasher 225 applies a hash function to the bi-grams and uses feature hash values as indices. Feature hashing using the hasher 225 provides an increase in clustering efficiency. For example, mapping features to hash keys allows multiple features to be mapped to the same key, thereby reducing the number of features from very high to mid-size dimensions. This hashing is performed once the extractor 210 has extracted highly prevalent and sparsely used features from the source code, as described above in association with the extractor 210.

The example clusterer 230 clusters samples once the hasher 225 has hashed the bi-grams and the extractor 210 has extracted application metadata. For example, the clusterer 230 clusters samples using agglomerative clustering. Agglomerative clustering is a bottom-up approach in which each sample starts as its own cluster and pairs of clusters are successively merged (i.e., agglomerated) into a single cluster that contains all known samples, as described in association with FIGS. 8-9. The clusterer 230 clusters samples by comparing each sample with each other sample (e.g., using a distance metric) to determine the shortest distance between pairs of samples and joining the pairs (e.g., to create a first cluster). The clusterer 230 then determines the distance between the first cluster and a second cluster outside of the first cluster, such that the process is repeated until all samples are assigned to one main cluster that links all clusters (e.g., the first cluster, the second cluster, etc.) together. Additionally, use of agglomerative clustering does not require prior knowledge of the number of clusters or define the number of clusters that need to be created.

The example dendrogram generator 235 generates a dendrogram. As used herein, a dendrogram is a visual representation (e.g., a tree-based visualization) of the agglomerative clustering performed by the clusterer 230. The dendrogram generator 235 provides a data structure that can encode grouping information from the first cluster to the total number of cluster available as a result of the clustering. As such, the dendrogram generator 235 generates a dendrogram that represents individual samples iteratively combined into larger and larger groups (e.g., clusters). As described in association with FIGS. 8-9, the dendrogram generated by the dendrogram generator 235 represents the distance or dissimilarity between clusters. As such, the dendrogram generator 235 provides a visual representation of the relationships between malware samples (e.g., known malware samples, unknown malware samples, etc.), providing an efficient way of identifying existing and/or emerging malware families. As described in connection with FIG. 5, the dendrogram generator 235 generates the dendrogram based on a distance metric (e.g., to measure similarity of samples between each other) and a linkage criterion (e.g., measures the level of dissimilarity between a first cluster and a second cluster), which can be determined during clustering of the samples using the clusterer 230.

The example scorer 238 determines a confidence score for a dendrogram generated with the dendrogram generator 235. For example, the confidence score is mapped as a parabolic curve, with coordinate points of the clusters separated into discrete confidence intervals. The use of a parabolic curve allows for consideration of upper and lower limits of standard deviation (e.g., with a 95% confidence interval, etc.), such that the confidence score can indicate the probability of matching (e.g., between an unknown sample and known sample(s) and/or known sample clusters). In some examples, the confidence score represents a threshold that determines the lowest matching score acceptable to trigger an interaction (e.g., indicate level of similarity of a given unknown sample to known samples diagrammed using the dendrogram). As such, the scorer 238 generates a confidence score specific to a given dendrogram, allowing a security researcher to prioritize results in addition to being able to visualize the clusters, as described in connection with FIG. 9.

The anchor point identifier 240 traverses the dendrogram generated by the dendrogram generator 235 to identify anchor point samples that can be used to assess an unknown sample. For example, based on the confidence score assigned by the scorer 238 to the generated dendrogram, a sub-set of samples is assessed by the anchor point identifier 240 to identify anchor points that represent sample clusters that show the greatest similarity to an unknown sample being assessed (e.g., a malware sample that needs to be classified as a variant of a known malware family or as part of a new malware family indicative of new campaigns and/or threats). The anchor point identifier 240 further provides metadata (e.g., family names) that can be used to extrapolate information to the new unknown sample under investigation, as described in connection with FIG. 9.

The database 245 is provided to store data associated with analyzing malware samples. For example, the database 245 stores sample source code at various stages of processing by the malware sample analyzer 130 (e.g., new sample(s) received from computing device(s) 110, decompiled code, tokenized code, hashed code, generated dendrograms, assigned confidence scores, etc.). The database 245 can be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The database 245 can additionally or alternatively be implemented by double data rate (DDR) memories, such as DDR, DDR2, DDR3, DDR4, mobile DDR (mDDR), etc. The database 245 can additionally or alternatively be implemented by one or more mass storage devices such as hard disk drive(s), compact disk drive(s), digital versatile disk drive(s), solid-state disk drive(s), etc. While in the illustrated example the database 245 is illustrated as a single database, the database 245 can be implemented by any number and/or type(s) of databases. Furthermore, the data stored in the example database 245 can be in any data format such as, for example, binary data, comma delimited data, tab delimited data, structured query language (SQL) structures, etc.

While an example manner of implementing the malware sample analyzer 130 of FIG. 1 is illustrated in FIG. 2, one or more of the elements, processes and/or devices illustrated in FIG. 2 may be combined, divided, re-arranged, omitted, eliminated and/or implemented in any other way. Further, the example decompiler 205, the example extractor 210, the example tokenizer 215, the example bi-gram generator 220, the example hasher 225, the example clusterer 230, the example dendrogram generator 235, the example scorer 238, the example anchor point identifier 240, the example database 245 and/or, more generally, the example malware sample analyzer 130 may be implemented by hardware, software, firmware and/or any combination of hardware, software and/or firmware. Thus, for example, any of the example decompiler 205, the example extractor 210, the example tokenizer 215, the example bi-gram generator 220, the example hasher 225, the example clusterer 230, the example dendrogram generator 235, the example scorer 238, the example anchor point identifier 240, the example database 245 and/or, more generally, the example malware sample analyzer 130 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example decompiler 205, the example extractor 210, the example tokenizer 215, the example bi-gram generator 220, the example hasher 225, the example clusterer 230, the example dendrogram generator 235, the example scorer 238, the example anchor point identifier 240, the example database 245 and/or, more generally, the example malware sample analyzer 130 is/are hereby expressly defined to include a non-transitory computer readable storage device or storage disk such as a memory, a digital versatile disk (DVD), a compact disk (CD), a Blu-ray disk, etc. including the software and/or firmware. Further still, the example malware sample analyzer of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the malware sample analyzer of FIG. 2 are shown in FIGS. 3-6. The machine readable instructions may be one or more executable programs or portion(s) of an executable program for execution by a computer processor and/or processor circuitry, such as the processor 1012 shown in the example processor platform 1000 discussed below in connection with FIG. 10. The program may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIGS. 3-6, many other methods of implementing the example malware sample analyzer 130 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 3-6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 3:
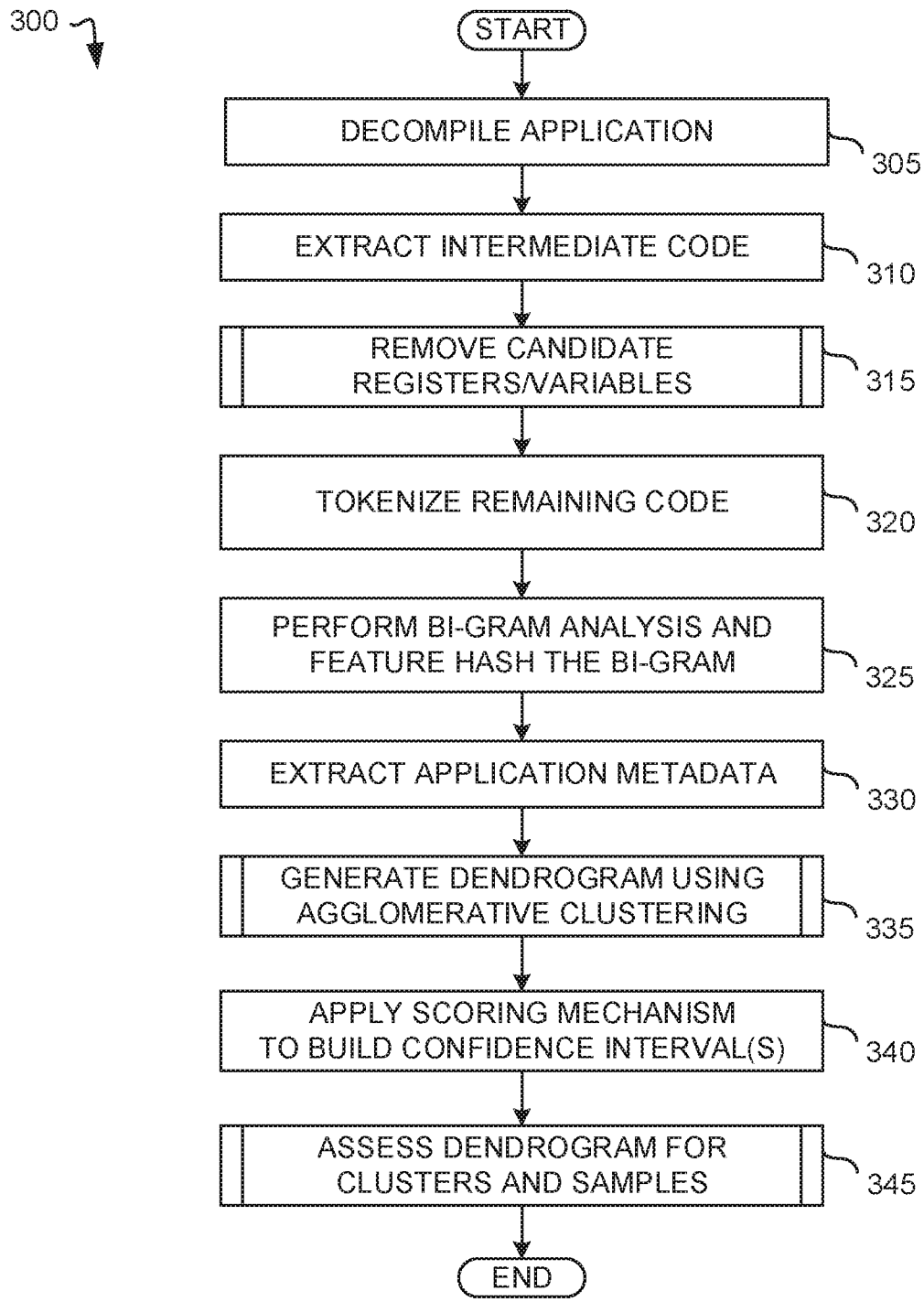
FIG. 3 is a flowchart representative of machine readable instructions which may be executed to implement the malware sample analyzer of FIGS. 1 and/or 2.

FIG. 3 is a flowchart representative of machine readable instructions 300 which may be executed to implement the malware sample analyzer of FIGS. 1 and/or 2. The malware sample analyzer 130 decompiles one or more sample(s) received from the computing device(s) 110 using the decompiler 205. The sample(s) received by the malware analyzer 130 can include an application known to contain malware and/or an application requiring assessment to determine whether it is benign (i.e., goodware), part of an existing malware family, or part of an emerging or re-emerging malware family. The decompiler 205 decompiles the application to yield source code (block 305). The extractor 210 extracts intermediate code to be used for the removal of candidate registers, variables, and/or libraries (block 310). The extractor 210 removes registers, variables, and/or libraries based on highly prevalent features (e.g., occurring in over 90% of the corpus) and/or sparsely used features (e.g., occurring in under 10% of the corpus), as described in connection with FIG. 4 (block 315). The tokenizer 215 tokenizes the remaining code, converting the source code into an array of tokens that define the core functionality of the application (block 320). The bi-gram generator 220 generates a bi-gram representing a sequence of two adjacent elements from a string of tokens generated using the tokenizer 215, while the hasher 225 performs feature hashing of the bi-grams to vectorize features to improve clustering efficiency (block 325). The extractor 210 further extract metadata from the application to obtain additional features (e.g., intents, authors, permissions, file information, etc.) to detect the functionality of the assessed application source code (block 330). For example, the extraction of metadata from samples provides an indication of whether the application shows malware patterns and provide additional information to identify similarity and/or dissimilarity between known malware samples and an unknown sample being assessed to determine whether it is part of an existing malware family or a newly emerging malware family.

The clusterer 230 clusters the feature-hashed bi-grams to determine a relationship among the provided samples (e.g., known malware samples) based on agglomerative clustering, as described in connection with FIG. 5. The dendrogram generator 235 generates a dendrogram to provide a visual representation of the inter-connection among the known malware samples (block 335). The scorer 238 applies a scoring mechanism to build confidence interval(s) that indicate the probability of matching an unknown sample to one or more known sample clusters determined using the dendrogram (block 340). In some examples, the scorer 238 determines a confidence score representative of a threshold indicating the lowest matching score acceptable to trigger an association between an unknown sample and known sample clusters, as described in connection with FIG. 9. For example, once the malware sample analyzer 130 receives an unknown sample to assess, the anchor point identifier 240 traverses the dendrogram to identify clusters of samples (e.g., anchor points) and/or individual samples which indicate a high level of confidence in their similarity to the unknown sample under assessment (block 345), as described in more detail in connection with FIG. 6. This permits a security researcher to narrow down specific known samples to compare the unknown samples to by introducing sample clusters that are statistically relevant to the given unknown sample (e.g., based on the confidence score). In some examples, the malware sample analyzer 130 allows for the building of a training data set that can be used to train a machine learning algorithm to classify an unknown sample directly (e.g., part of a known malware family, part of a new malware family, or benign). The generated dendrogram(s) can be stored in the database 245 and updated with new known samples and/or unknown samples to reflect the growing assessment of malware samples over time, thereby gradually improving in accuracy with added quantity of available samples to compare against as novel malware families are identified.

Figure 4:
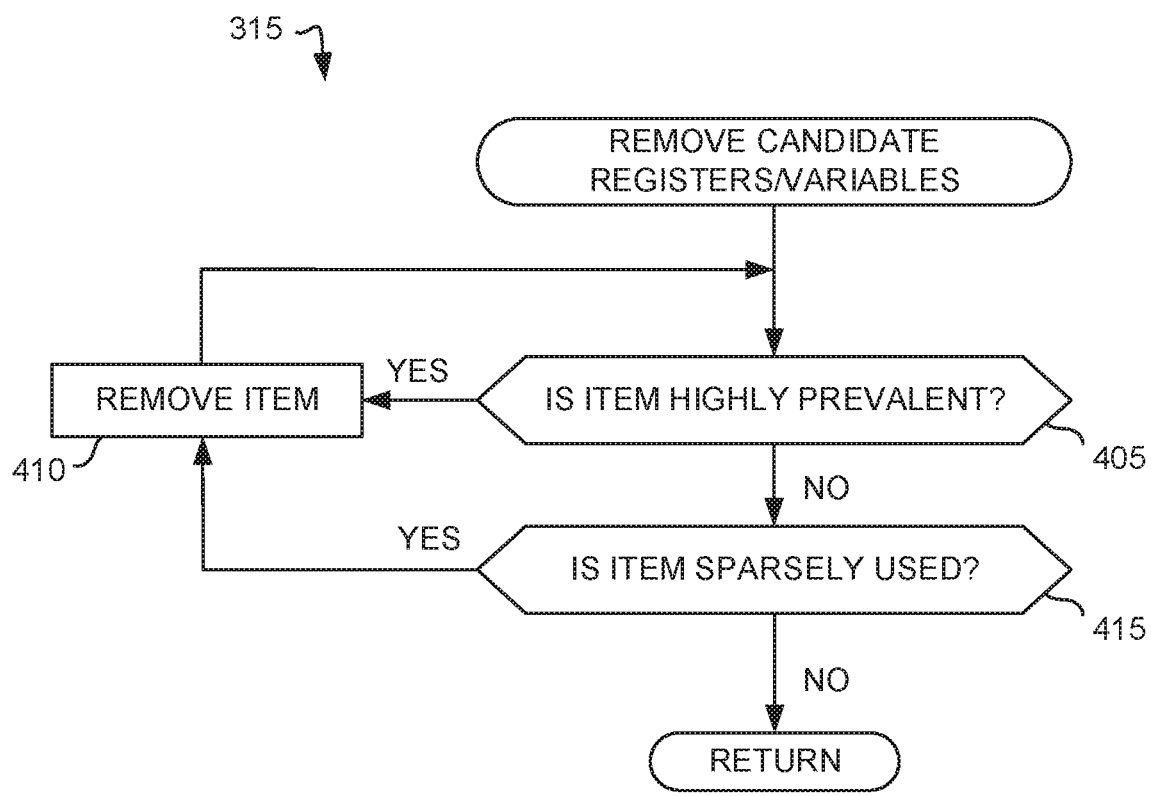
FIG. 4 is a flowchart representative of example machine readable instructions which may be executed to implement the malware sample analyzer of FIGS. 1 and/or 2 to remove candidate registers, variables, and/or libraries.

FIG. 4 is a flowchart representative of example machine readable instructions 315 which may be executed to implement the malware sample analyzer of FIGS. 1 and/or 2 to remove candidate registers, variables, and/or libraries. The extractor 210 identifies if a register, variable, and/or library of the decompiled application source code is a highly prevalent feature (block 405). For example, when assessing an Android-based application, the extractor 210 identifies a library that is native to Android (e.g., Lcom/android/java of FIG. 7) and seen in over 90% of the corpus of samples. Upon identifying a highly prevalent feature, the extractor 210 removes the item (e.g., a feature of the application) (block 410). If the extractor 210 no longer identifies any highly-prevalent features, the extractor determines if the source code includes features that are sparsely used (block 415). For example, a register that occurs in less than 10% of the corpus of samples is removed, in order to focus on features that more closely differentiate the samples from each other. Once the extractor 210 has identified and removed any highly-relevant and/or sparsely-used features in the source code, control returns to the malware sample analyzer 130 to tokenize the remaining source code to define to core functionality of the application.

Figure 5:
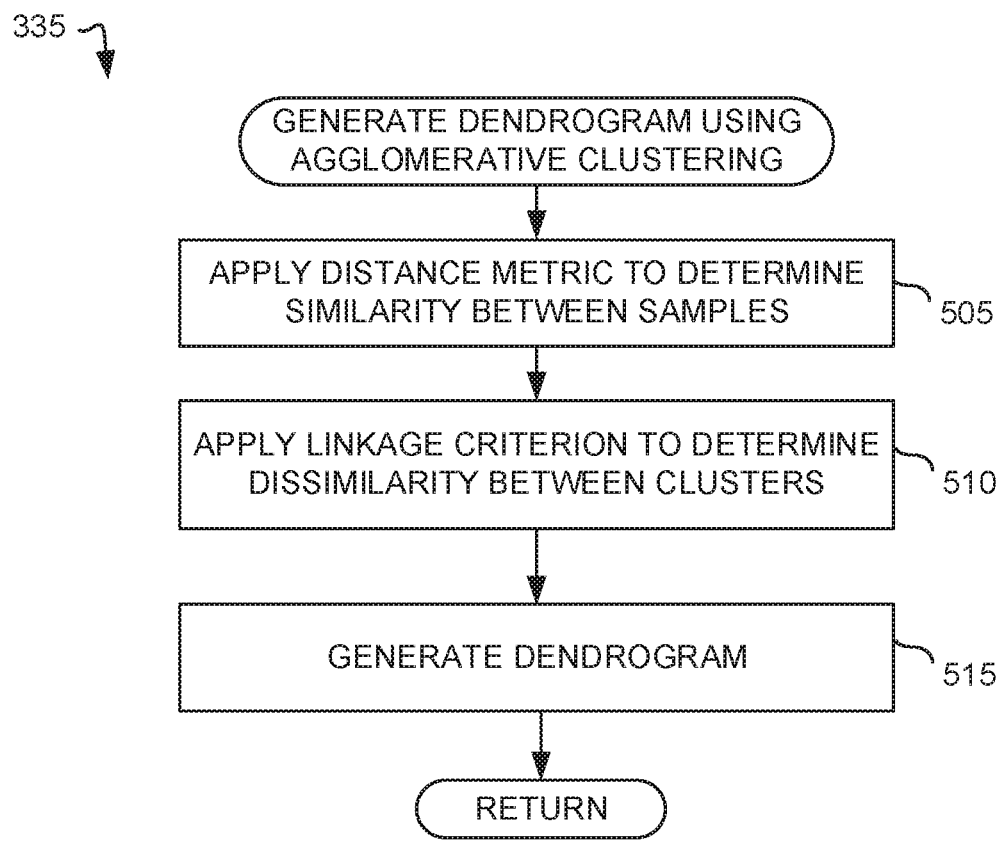
FIG. 5 is a flowchart representative of example machine readable instructions which may be executed to implement the malware sample analyzer of FIGS. 1 and/or 2 to generate a dendrogram using agglomerative clustering.

FIG. 5 is a flowchart representative of example machine readable instructions 335 which may be executed to implement the malware sample analyzer of FIGS. 1 and/or 2 to generate a dendrogram using agglomerative clustering. The clusterer 230 applies a distance metric to determine similarity between samples (block 505). For example, the clusterer 230 compares each sample point with other sample points to determine pairs of sample points that have the smallest distance between them (i.e., greatest amount of similarity of source code features between the samples). The dendrogram generator 235 can use this distance metric to create joining lines between the sample points, with the process repeated until all samples with similarity to other samples are joined together. For example, the clusterer 230 also determines a distance between a first cluster and a second cluster outside of the first cluster until all clusters are linked together (e.g., the first cluster, the second cluster, etc.). To generate the full cluster, the clusterer 230 applies a linkage criterion to determine dissimilarity between the sample clusters (block 510). For example, the clusterer 230 determines the distance between clusters such that clusters that are most dissimilar are positioned further apart. The dendrogram generator 235 uses the results of the clustering to produce a visual output of the data in the form of a dendrogram (block 515). Such a dendrogram is the result of agglomerative clustering, given that the data start with individual samples and progresses into clusters that are linked based on their distance from one another (e.g., the distance metric), such that clusters with greatest similarity merge together over time. As the process repeats, all of the samples are eventually joined as one major cluster, with distances between individual clusters (e.g., linkage criterion) indicating their similarity to other another. The tree-based representation of the data is output as a dendrogram by the dendrogram generator 235, as shown and described in connection with FIGS. 8-9.

Figure 6:
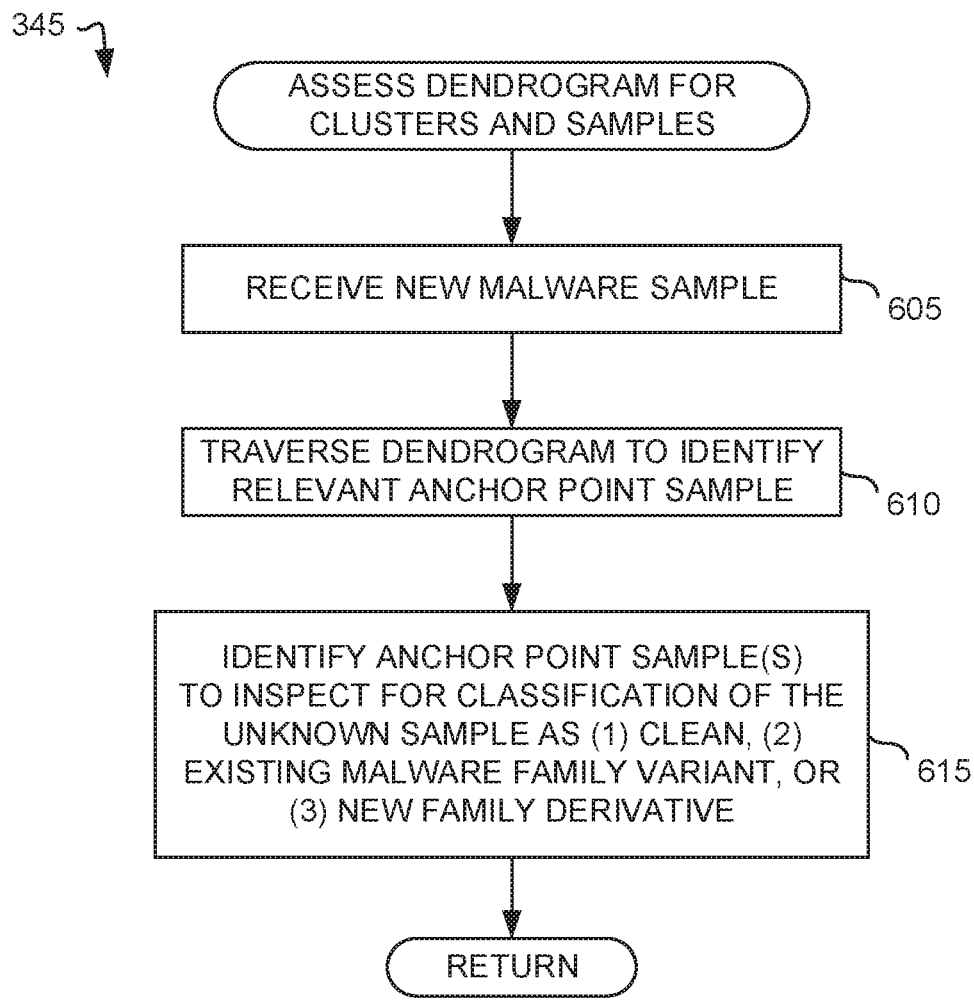
FIG. 6 is a flowchart representative of example machine readable instructions which may be executed to implement the malware sample analyzer of FIGS. 1 and/or 2 to assess the dendrogram for clusters and samples.

FIG. 6 is a flowchart representative of example machine readable instructions 345 which may be executed to implement the malware sample analyzer of FIGS. 1 and/or 2 to assess the dendrogram for clusters and samples. Once the dendrogram generator 235 generates a dendrogram as described in connection with FIG. 5 and the scorer 238 assigns a confidence score to the dendrogram as described in connection with FIG. 2, the anchor point identifier 240 traverses the dendrogram to identify clusters and/or samples relevant to a specific unknown sample under assessment. For example, the malware sample analyzer 130 receives a new malware sample for assessment from the computing device(s) 110. In some examples, the malware sample is an unknown sample that is not definitively categorized as malware and could be a variant of an existing malware family or part of a new and/or emerging malware family that is not yet identified. To lessen the burden on a security researcher in having to compare the unknown sample (block 605) with a large quantity of previously-assessed samples, the malware sample analyzer 130 provides the generated dendrogram to the user to assess the received new sample against anchor point samples the anchor point identifier 240 identifies as being relevant (block 610). For example, the anchor point samples can be any samples and/or malware family clusters (e.g., known malware families and/or potential malware families) that have a similarity of features among them as identified using the confidence score assigned by the scorer 238, as described in connection with FIG. 9. In some examples, the anchor point identifier 240 identifies anchor point family names if the samples are known to belong to a specific malware family and/or indicates anchor points that may be representative of emerging malware families (block 615). In some examples, the anchor point identifier 240 indicates if an unknown sample under analysis does not match any anchor points on the generated dendrogram with a high level of confidence (e.g., based on confidence score), which a user modifies based on preferred confidence intervals (e.g., 95% confidence interval) to use during the calculation of the confidence score. Likewise, the dendrogram can be continuously updated in real-time as new known samples and/or previously unknown samples are added. Additionally, the user (e.g., security researcher) can select to re-evaluate existing anchor points to determine if re-classification is needed (e.g., if an unknown sample is identified as being equally close to two different anchor points belong to different malware families, etc.).

FIG. 7 illustrates an example process 700 of building a sample's vocabulary from decompiled software code, in accordance with the flowcharts of FIGS. 3 and/or 4. A decompiler 205 decompiles a sample code (e.g., from an Android application, etc.) received by the malware sample analyzer 130 from computing device(s) 110. For example, any Android application devoid of a target Software Development Kit (SDK) can be used to retrieve code features as described below. An example stub code 710 from a decompiled application is shown in FIG. 7. The decompiled stub code 710 can result from, for example, the decompiler 205 creating a high-level source file from an executable file provided as input. If a decompiler 205 is unable to reconstruct the original source code without obfuscations, code obfuscation does not adversely affect the analysis of the sample application using agglomerative clustering. For example, key features are extracted from the decompiled code and a dendrogram generated using agglomerative clustering is used as a guide for a security researcher to assess the code rather than serving as a classifier of what is or is not to be considered malware. To identify key features that differentiate one sample from another, the extractor 210 removes features (e.g., libraries, registers, variables, etc.) that are highly prevalent (i.e., occurring in over 90% of the sample corpus) and/or features that are sparsely used (i.e., occurring in less than 10% of the sample corpus). In FIG. 7, an example post-extraction code 720 indicates changes made to the stub code 720 after removal of candidate registers and/or variables (e.g., used to hold one or more values, such as results of a calculation, database call, results of a database query, or other value, etc.). As such, in the example of FIG. 7, post-extraction code 720 includes removed sections of code corresponding to the registers and/or variables that are highly prevalent and/or sparsely used in the sample corpus (e.g., v3, p0; {p0, v9, v0, v3}; :goto_1c8, etc.). The extractor 210 also removes highly prevalent and/or scarcely used libraries. In the example of FIG. 7, a common Android library (e.g., Lcom/android/java/) (e.g., seen in over 90% of the sample corpus) is removed, as shown in an example library post-extraction code 730, when compared to the post-extraction code 720. Additionally, libraries that are sparsely used in a given sample corpus (e.g., Lcom/game/ads/testlab) can also be removed using the extractor 210, as seen in the library post-extraction code 730. The tokenizer 215 tokenizes the remaining code (e.g., library post-extraction code 730) to obtain the "grammar" of the application (e.g., defining the core functionality of the application). In FIG. 7, an example tokenized code 740 shows natural language processing-based modifications (e.g., removal of slashes in Lcom/sprdbrig/egetcka/csmdotg to yield Lcomsprdbrigegetck-acsmdotg). To further refine the "grammar" of the application sample provided via tokenization, a bi-gram generator 220 can be used to generate bi-grams of the tokenized code 740. For example, the bi-gram generator 220 generates sequences of two adjacent elements from a string of tokens, such that the tokenized code 740 includes duplicates of code strings being generated, as shown in an example bi-gram code 750 of FIG. 7. In some examples, an n-gram is be used instead of a bi-gram, such that an n number of grams are generated representing a contiguous sequence of n items from the tokenized code. In some examples, n is a fixed number that is dependent on the corpus of samples and the queries made against that corpus. In such examples, the bi-gram generator 220 may additionally or alternatively be referred to as an n-gram generator. In the example of FIG. 7, the resulting bi-gram code 750 is feature hashed using the hasher 225 to vectorize features for increased clustering efficiency. The extraction of functionality-describing features as detailed above permits resilience to false positives by focusing on specific feature-based characteristics of the source code.

Figure 8:
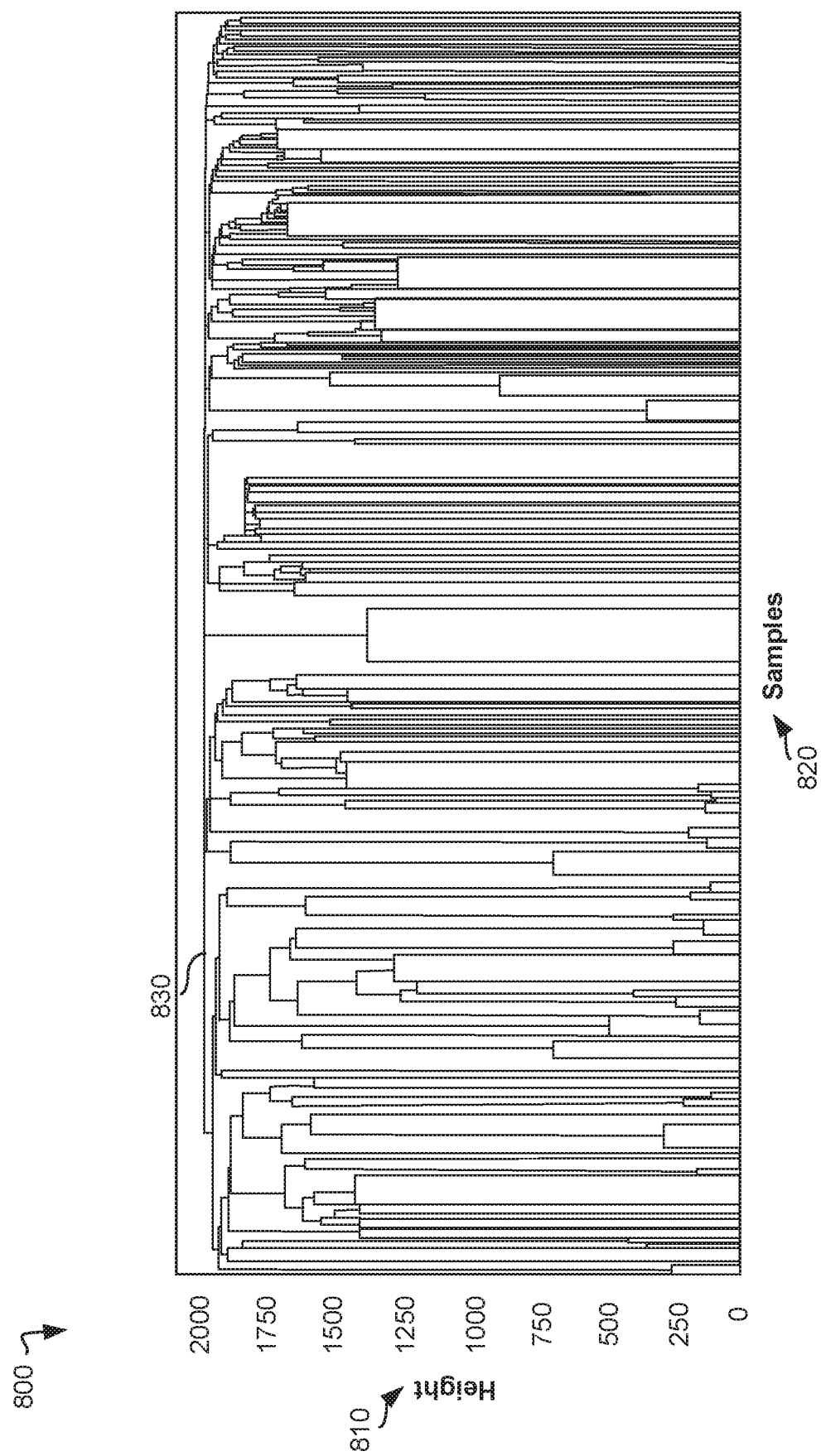
FIG. 8 illustrates an example dendrogram generated using agglomerative clustering, in accordance with the flowcharts of FIGS. 3 and/or 5.

FIG. 8 illustrates an example dendrogram 800 generated using agglomerative clustering, in accordance with the flowcharts of FIGS. 3 and/or 5. The malware sample analyzer 130 generates a dendrogram using the dendrogram generator 235 as a visual representation of agglomerative clustering performed by the clusterer 230. For example, the cluster 230 uses a distance metric to measure similarity of samples between each other and a linkage criterion to measure the level of dissimilarity between clusters. In the example of FIG. 8, as the dendrogram is traversed from the bottom upwards (i.e., along example height 810), the confidence in the analysis decreases. The example horizontal distance 820 indicates the number of individual samples assessed by the malware sample analyzer 130 as part of the dendrogram 800 generated using the dendrogram generator 235. The clusterer 230 identifies samples that have the most similar features (e.g., using the distance metric) and links and/or merges the samples together using a horizontal line, with the y-coordinate of the horizontal line indicating the similarity of the two samples and/or clusters being merged. As such, moving from the bottom layer to the top of the dendrogram permits a reconstruction of the history of merges that result in the depicted clustering (i.e., agglomerative clustering that starts with single sample and iteratively combines them into larger groups). The dendrogram 800 similarly demonstrates the level of dissimilarity among clusters based on distances between clusters, such that clusters connected using a horizontal line closer to the top of the dendrogram 800 are less similar. All of the clusters are eventually linked together as an example single root cluster 830 to show the hierarchy of the data. As indicated by the dendrogram 800 of FIG. 8, the number of malware samples and/or individual clusters that a potential unknown sample is to be compared to is very high. The dendrogram generator 235 generates a sub-section 900 of the dendrogram 800 as shown in the example of FIG. 9 that narrows down the total number of samples to be considered during analysis of an unknown sample (i.e., to determine if the unknown sample is part of an existing malware family, part of an emerging malware family, or benign).

Figure 9:
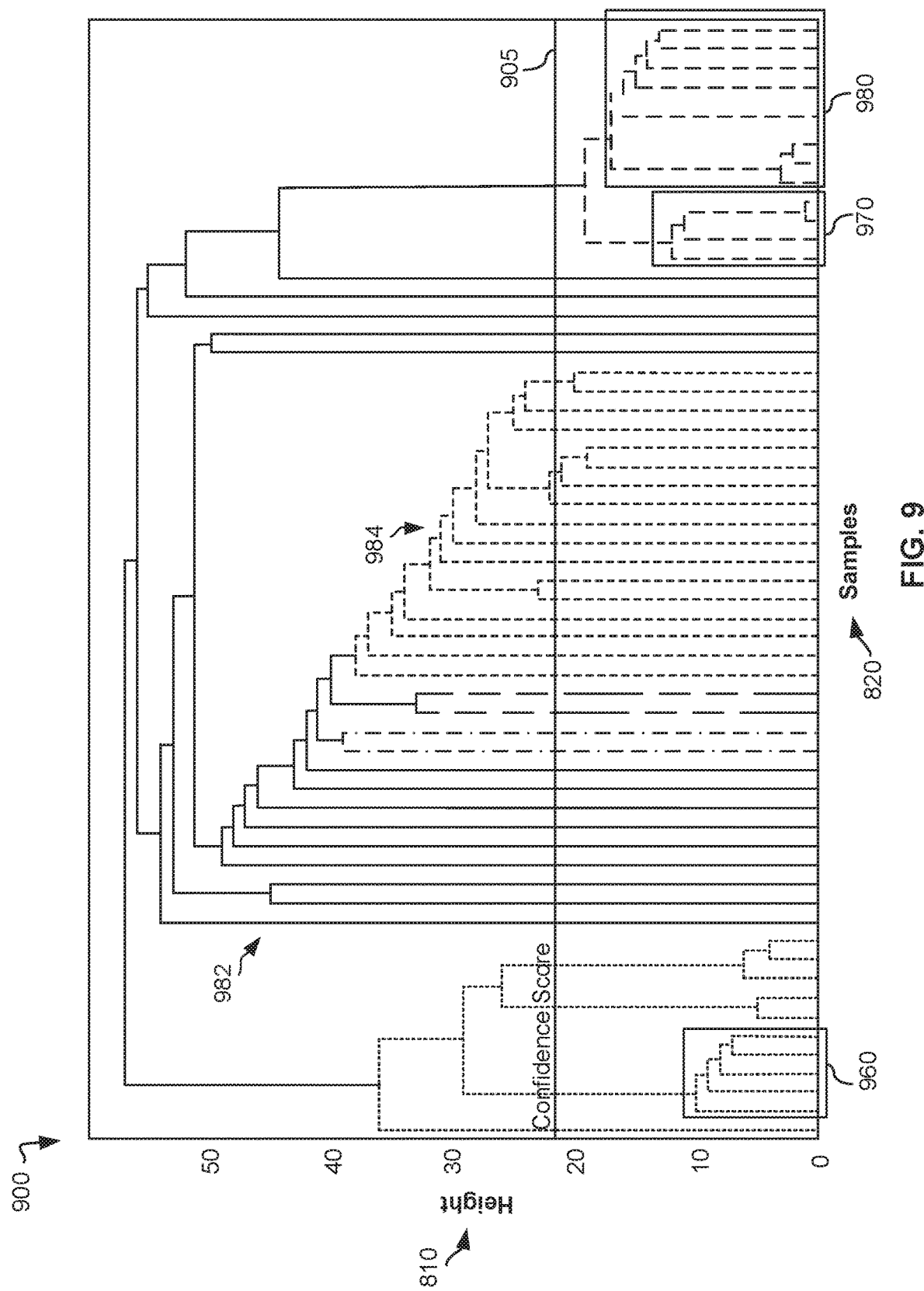
FIG. 9 illustrates an example dendrogram sub-section retrieved from the dendrogram of FIG. 8 identifying example anchor points for assessment of an unknown malware sample, in accordance with the flowcharts of FIGS. 3 and/or 6.

FIG. 9 illustrates an example dendrogram sub-section 900 retrieved from the dendrogram 800 of FIG. 8 identifying example anchor points for assessment of an unknown malware sample, in accordance with the flowcharts of FIGS. 3 and/or 6. The dendrogram sub-section 900 can be used by a security researcher, for example, to navigate through malware samples that are closer and/or similar to an unknown sample under assessment. The sub-set of samples used for the sub-section 900 of the dendrogram 800 is determined using an example confidence score 905 generated by the scorer 238. For example, the dendrogram 900 includes individual samples (e.g., shown as individual lines originating from the horizontal axis), and samples that are clustered. Instead of assessing all of these samples, the confidence score 905 allows identification of individual samples and/or clusters that are most similar to the unknown sample being analyzed, within a specific confidence interval. Based on the confidence interval selected (e.g., 95% confidence interval, etc.), the dendrogram 900 includes a confidence score that indicates samples that should be considered for analysis (e.g., samples and/or clusters positioned below the confidence score 905 of FIG. 9). The confidence score 905 sections the dendrogram and indicates which clusters should be considered in the analysis by representing a cut-off point that provides a fixed set of clusters to evaluate (e.g., clusters 960, 970, 980, etc.). As such, any cluster below the confidence score 905 is more relevant to the analysis of an unknown sample compared to any cluster above the confidence score 905.

Once the confidence score 905 is identified using the scorer 238, the identifier 240 traverses the dendrogram 900 to identify anchor point samples (e.g., clusters located at or below the confidence score 905) that can be used to assess an unknown sample. The isolated anchor points (e.g., clusters 960, 970, and/or 980 of FIG. 9) can include metadata (e.g., family name) that can be used to extrapolate information to the new unknown sample. In the example of FIG. 9, the cluster of samples 960 can be identified as a Trojan-Dropper.AndroidOS.Agent.snt malware family (e.g., part of Trojan-Dropper class identified on the Android OS platform which displays a false error message and installs applications invisibly to the user). The cluster of samples 970 and 980 can be identified as a Trojan-SMS.AndroidOS.Agent-.pac malware family and a Trojan-SMS.AndroidOS-.FakeInst malware family, respectively (e.g., part of Trojan-SMS class identified on the Android OS platform designed to steal money from Android mobile devices). As such, in the example of FIG. 9, an unknown sample is compared to samples within these known malware families (e.g., clusters 960, 970, and/or 980) to determine whether the unknown sample can be classified as a variant of one of these existing malware families. Additionally, the unknown sample can be compared to other samples that are suspected as being part of re-emerging or novel malware families. In the example of FIG. 9, a confidence score 905 that cuts off at a height of 50 instead of 22 would incorporate clusters 982 and/or 984 for assessment. Clusters 982, 984 are potentially new malware families that are not yet named and/or definitively identified. While in the example of FIG. 9 the samples of anchor points represented by clusters 960, 970, and/or 980 are identified to be closer in similarity to an unknown sample being assessed by the malware sample analyzer 130, the absence of identified anchor points can indicate that the unknown sample can belong to a malware family that is evolving and/or being revived. Once classified, the unknown sample can be added to the dendrogram to allow for its continual evolution as the number of samples increases and new malware families are identified in real-time, allowing future unknown samples to be identified using an updated agglomerated dendrogram.

Figure 10:
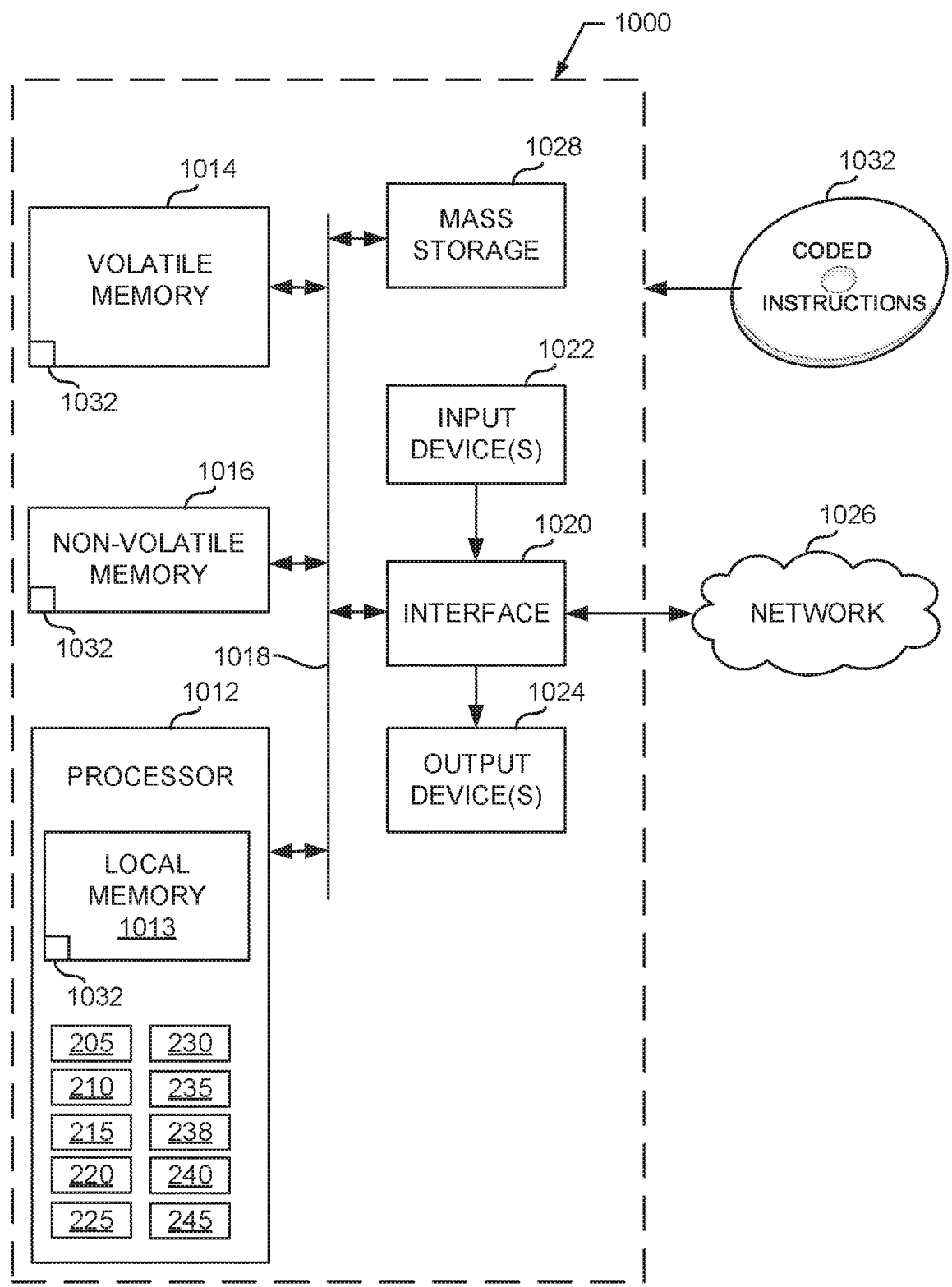
FIG. 10 is a block diagram of an example processing platform structured to execute the instructions of FIGS. 3, 4, 5 and/or 6 to implement the malware sample analyzer of FIGS. 1 and/or 2.

FIG. 10 is a block diagram of an example processing platform structured to execute the instructions of FIGS. 3, 4, 5 and/or 6 to implement the malware sample analyzer of FIGS. 1 and/or 2. The processor platform 1000 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor 1012 may be a semiconductor based (e.g., silicon based) device. In this example, the processor 1012 implements the example decompiler 205, the example extractor 210, the example tokenizer 215, the example bi-gram generator 220, the example hasher 225, the example clusterer 230, the example dendrogram generator 235, the example scorer 238, the example anchor point identifier 240, and/or the example database 245 of FIG. 2.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives.

Example machine executable instructions 1032 represented in FIGS. 3, 4, 5, and/or 6 may be stored in the mass storage device 1028, in the volatile memory 1014, in the non-volatile memory 1016, and/or on a removable non-transitory computer readable storage medium such as a CD or DVD.

Figure 11:
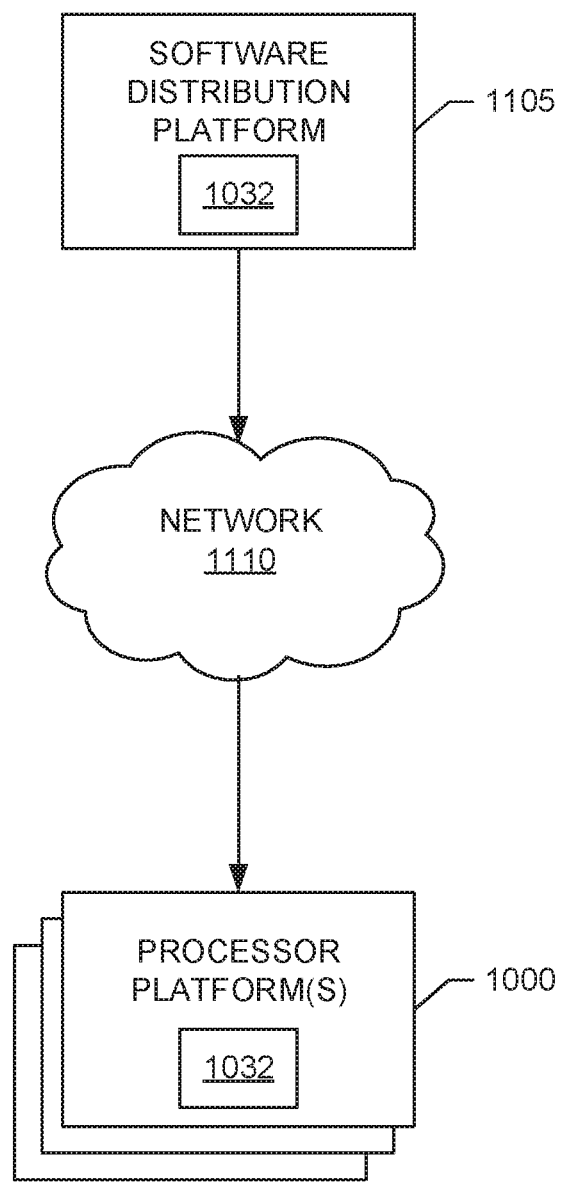
FIG. 11 is a block diagram of an example software distribution platform to distribute software (e.g., software corresponding to the example computer readable instructions of FIGS. 3, 4, 5, and/or 6) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 1105 to distribute software such as the example computer readable instructions 1032 of FIG. 10 to third parties is illustrated in FIG. 11. The example software distribution platform 1105 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 1032 of FIG. 10. The third parties may be consumers, users, retailers, OEMs, etc., who purchase and/or license the software for use and/or re-sale and/or sub-licensing. In the illustrated example, the software distribution platform 1105 includes one or more servers and one or more storage devices. The storage devices store the computer readable instructions 1032, which may correspond to the example computer readable instructions 300 of FIGS. 3, 4, 5, and/or 6, as described above. The one or more servers of the example software distribution platform 1105 are in communication with a network 1110, which may correspond to any one or more of the Internet and/or any of the example networks described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 1032 from the software distribution platform 1105. For example, the software, which may correspond to the example computer readable instructions 1032 of FIG. 10, may be downloaded to the example processor platform 1000, which is to execute the computer readable instructions 1032 to implement the malware sample analyzer 130 of FIG. 1. In some example, one or more servers of the software distribution platform 1105 periodically offer, transmit, and/or force updates to the software (e.g., the example computer readable instructions 1032 of FIG. 10) to ensure improvements, patches, updates, etc. are distributed and applied to the software at the end user devices.

From the foregoing, it will be appreciated that example methods and apparatus have been disclosed for classification of unknown samples using agglomerative clustering. Unlike other clustering techniques, agglomerative clustering does not require the identification of the number of clusters required for assessment, which can be modified based on user input. Methods and apparatus described herein permit more efficient classification of an unknown sample suspected to be part of a malware family to determine whether the unknown sample is a variant of a known malware family, part of an emerging malware family, or a benign sample (e.g., goodware). In the examples disclosed herein, a malware sample analyzer generates a dendrogram that clusters malware samples to determine which samples and/or clusters an unknown sample is most similar to based on extracted features that are compared across the sample corpus. As such, extraction of functionality-describing features from samples (e.g., Android applications) permits categorization of unknown samples by agglomeratively clustering known samples without the need to define the number of clusters that are required (e.g., a confidence score determines the number of clusters to consider during the analysis). In the examples disclosed herein, an automated mechanism is used to obtain a visual representation of the similarities and/or dissimilarities among samples, guiding security researchers in the categorization of unknown samples.

The presently described methods and apparatus can be implemented according to a plurality of examples. In certain examples, the extractor 210 provides a means for extracting a feature from a sample source code, the feature including at least one of a register, a variable, or a library based on a threshold of occurrence in a corpus of samples, the corpus of samples including malware samples. In certain examples, the dendrogram generator 235 provides means for generating a dendrogram based on features extracted from the sample source code, the dendrogram representing a collection of samples clustered based on similarity among the samples, the samples including sample clusters belonging to known malware families. In certain examples, the anchor point identifier 240 provides means for traversing the dendrogram to identify similarity of an unknown sample to the sample clusters based on a confidence score. The anchor point identifier 240 also provides means for identifying anchor point samples from the sample clusters identified using the means for traversing the dendrogram, the anchor point samples to provide metadata for use in extrapolating information to classify the unknown sample. In certain examples, the tokenizer 215 provides means for generating a sequence of adjacent tokenized source code strings based on the feature-extracted sample source code using the means for extracting, the hasher 225 provides means for hashing the tokenized source code strings, and the clusterer 230 provides means for clustering the hashed source code using a distance metric or a linkage criterion, the dendrogram generated based on the clustering. In certain examples, the scorer 238 provides means for mapping the confidence score as a parabolic curve using coordinate points of the sample clusters on the dendrogram to sort the sample clusters into discrete confidence intervals.

Example methods and apparatus for unknown sample classification using agglomerative clustering are disclosed herein. Further examples and combinations thereof include the following:

Example 1 includes an apparatus comprising an extractor to extract a feature from a sample source code, the feature including at least one of a register, a variable, or a library based on a threshold of occurrence in a corpus of samples, the corpus of samples including malware samples, a dendrogram generator to generate a dendrogram based on features extracted from the sample source code, the dendrogram representing a collection of samples clustered based on similarity among the samples, the samples including sample clusters belonging to known malware families, and an anchor point identifier to traverse the dendrogram to identify similarity of an unknown sample to the sample clusters based on a confidence score, and identify anchor point samples from the sample clusters identified as similar to the unknown sample, the anchor point samples to provide metadata for use in extrapolating information to classify the unknown sample.

Example 2 includes the apparatus of example 1, wherein the unknown sample is a sample to be classified as a sample of the known malware families, a sample of an emerging malware family, or a benign sample.

Example 3 includes the apparatus of example 1, further including an n-gram generator to generate a sequence of adjacent tokenized source code strings based on the feature-extracted sample source code, a hasher to hash the tokenized source code strings, and a clusterer to cluster the hashed source code using a distance metric or a linkage criterion, the dendrogram generated based on the clustering.

Example 4 includes the apparatus of example 3, wherein the distance metric is to identify a similarity between a first hashed sample and a second hashed sample.

Example 5 includes the apparatus of example 3, wherein the linkage criterion is to identify a dissimilarity between a first sample cluster and a second sample cluster.

Example 6 includes the apparatus of example 3, wherein the sample source code is an application source code, the extractor to extract application metadata, the metadata including intents, permissions, or file information to be used as sample features to detect application functionality.

Example 7 includes the apparatus of example 1, wherein the confidence score is to be mapped as a parabolic curve using coordinate points of the sample clusters on the dendrogram to sort the sample clusters into discrete confidence intervals.

Example 8 includes a non-transitory computer readable storage medium comprising instructions which, when executed, cause at least one processor to at least extract a feature from a sample source code, the feature including at least one of a register, a variable, or a library based on a threshold of occurrence in a corpus of samples, the corpus of samples including malware samples, generate a dendrogram based on features extracted from the sample source code, the dendrogram representing a collection of samples clustered based on similarity among the samples, the samples including sample clusters belonging to known malware families, traverse the dendrogram to identify similarity of an unknown sample to the sample clusters based on a confidence score, and identify anchor point samples from the sample clusters identified as similar to the unknown sample, the anchor point samples to provide metadata for use in extrapolating information to classify the unknown sample.

Example 9 includes the non-transitory computer readable storage medium of example 8, wherein the unknown sample is to be classified as at least one of a sample of the known malware families, a sample of an emerging malware family, or a benign sample.

Example 10 includes the non-transitory computer readable storage medium of example 8, wherein the instructions, when executed, cause the at least one processor to generate a sequence of adjacent tokenized source code strings based on the feature-extracted sample source code, hash the tokenized source code strings, and cluster the hashed source code using a distance metric or a linkage criterion, the dendrogram generated based on the clustering.

Example 11 includes the non-transitory computer readable storage medium of example 10, wherein the instructions, when executed, cause the at least one processor to extract application metadata from the sample source code, the metadata including intents, permissions, or file information to be used as sample features to detect application functionality.

Example 12 includes the non-transitory computer readable storage medium of example 10, wherein the instructions, when executed, cause the at least one processor to map the confidence score as a parabolic curve using coordinate points of the sample clusters on the dendrogram to sort the sample clusters into discrete confidence intervals.

Example 13 includes the non-transitory computer readable storage medium of example 10, wherein the instructions, when executed, cause the at least one processor to identify a similarity between a first hashed sample and a second hashed sample using the distance metric.

Example 14 includes the non-transitory computer readable storage medium of example 10, wherein the instructions, when executed, cause the at least one processor to identify a dissimilarity between a first sample cluster and a second sample cluster using the linkage criterion.

Example 15 includes a method, comprising extracting a feature from a sample source code, the feature including at least one of a register, a variable, or a library based on a threshold of occurrence in a corpus of samples, the corpus of samples including malware samples, generating a dendrogram based on features extracted from the sample source code, the dendrogram representing a collection of samples clustered based on similarity among the samples, the samples including sample clusters belonging to known malware families, traversing the dendrogram to identify similarity of an unknown sample to the sample clusters based on a confidence score, and identifying anchor point samples from the sample clusters identified as similar to the unknown sample, the anchor point samples to provide metadata for use in extrapolating information to classify the unknown sample.

Example 16 includes the method of example 15, further including generating a sequence of adjacent tokenized source code strings based on the feature-extracted sample source code, hashing the tokenized source code strings, and clustering the hashed source code using a distance metric or a linkage criterion, the dendrogram generated based on the clustering.

Example 17 includes the method of example 16, further including extracting application metadata from the source code, the metadata including at least one of an intent, a permission, or file information to be used as a sample feature to detect application functionality.

Example 18 includes the method of example 16, further including mapping the confidence score as a parabolic curve using coordinate points of the sample clusters on the dendrogram to sort the sample clusters into discrete confidence intervals.

Example 19 includes the method of example 16, wherein the unknown sample is a sample to be classified as a sample of the known malware families, a sample of an emerging malware family, or a benign sample.

Example 20 includes the method of example 16, further including identifying a similarity between a first hashed sample and a second hashed sample using the distance metric.

Example 21 includes the method of example 16, further including identifying a dissimilarity between a first sample cluster and a second sample cluster using the linkage criterion.

Example 22 includes an apparatus comprising means for extracting a feature from a sample source code, the feature including at least one of a register, a variable, or a library based on a threshold of occurrence in a corpus of samples, the corpus of samples including malware samples, means for generating a dendrogram based on features extracted from the sample source code, the dendrogram representing a collection of samples clustered based on similarity among the samples, the samples including sample clusters belonging to known malware families, means for traversing the dendrogram to identify similarity of an unknown sample to the sample clusters based on a confidence score, and means for identifying anchor point samples from the sample clusters identified using the means for traversing the dendrogram, the anchor point samples to provide metadata for use in extrapolating information to classify the unknown sample.

Example 23 includes the apparatus of example 22, further including means for generating a sequence of adjacent tokenized source code strings based on the feature-extracted sample source code using the means for extracting, means for hashing the tokenized source code strings, and means for clustering the hashed source code using a distance metric or a linkage criterion, the dendrogram generated based on the clustering.

Example 24 includes the apparatus of example 22, further including means for mapping the confidence score as a parabolic curve using coordinate points of the sample clusters on the dendrogram to sort the sample clusters into discrete confidence intervals.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
    an extractor to extract a feature from a sample source code, the feature including at least one of a register, a variable, or a library based on a threshold of occurrence in a corpus of samples, the corpus of samples including malware samples;
    a dendrogram generator to generate a dendrogram based on features extracted from the sample source code, the dendrogram representing a collection of samples clustered based on similarity among the samples, the samples including sample clusters belonging to known malware families; and an anchor point identifier to:
- traverse the dendrogram to identify similarity of an unknown sample to the sample clusters based on a confidence score; and
- identify anchor point samples from the sample clusters identified as similar to the unknown sample, the anchor point samples to provide metadata for use in extrapolating information to classify the unknown sample.

2. The apparatus of claim 1, wherein the unknown sample is a sample to be classified as a sample of the known malware families, a sample of an emerging malware family, or a benign sample.

3. The apparatus of claim 1, further including:
- an n-gram generator to generate a sequence of adjacent tokenized source code strings based on the feature-extracted sample source code;
- a hasher to hash the tokenized source code strings; and
- a clusterer to cluster the hashed source code using a distance metric or a linkage criterion, the dendrogram generated based on the clustering.

4. The apparatus of claim 3, wherein the distance metric is to identify a similarity between a first hashed sample and a second hashed sample.

5. The apparatus of claim 3, wherein the linkage criterion is to identify a dissimilarity between a first sample cluster and a second sample cluster.

6. The apparatus of claim 3, wherein the sample source code is an application source code, the extractor to extract application metadata, the metadata including intents, permissions, or file information to be used as sample features to detect application functionality.

7. The apparatus of claim 1, wherein the confidence score is to be mapped as a parabolic curve using coordinate points of the sample clusters on the dendrogram to sort the sample clusters into discrete confidence intervals.

8. A non-transitory computer readable storage medium comprising instructions which, when executed, cause at least one processor to at least:
- extract a feature from a sample source code, the feature including at least one of a register, a variable, or a library based on a threshold of occurrence in a corpus of samples, the corpus of samples including malware samples;
- generate a dendrogram based on features extracted from the sample source code, the dendrogram representing a collection of samples clustered based on similarity among the samples, the samples including sample clusters belonging to known malware families;
- traverse the dendrogram to identify similarity of an unknown sample to the sample clusters based on a confidence score; and
- identify anchor point samples from the sample clusters identified as similar to the unknown sample, the anchor point samples to provide metadata for use in extrapolating information to classify the unknown sample.

9. The non-transitory computer readable storage medium of claim 8, wherein the unknown sample is to be classified as at least one of a sample of the known malware families, a sample of an emerging malware family, or a benign sample.

10. The non-transitory computer readable storage medium of claim 8, wherein the instructions, when executed, cause the at least one processor to:
- generate a sequence of adjacent tokenized source code strings based on the feature-extracted sample source code;
- hash the tokenized source code strings; and
- cluster the hashed source code using a distance metric or a linkage criterion, the dendrogram generated based on the clustering.

11. The non-transitory computer readable storage medium of claim 10, wherein the instructions, when executed, cause the at least one processor to extract application metadata from the sample source code, the metadata including intents, permissions, or file information to be used as sample features to detect application functionality.

12. The non-transitory computer readable storage medium of claim 10, wherein the instructions, when executed, cause the at least one processor to map the confidence score as a parabolic curve using coordinate points of the sample clusters on the dendrogram to sort the sample clusters into discrete confidence intervals.

13. The non-transitory computer readable storage medium of claim 10, wherein the instructions, when executed, cause the at least one processor to identify a similarity between a first hashed sample and a second hashed sample using the distance metric.

14. The non-transitory computer readable storage medium of claim 10, wherein the instructions, when executed, cause the at least one processor to identify a dissimilarity between a first sample cluster and a second sample cluster using the linkage criterion.

15. A method, comprising:
- extracting a feature from a sample source code, the feature including at least one of a register, a variable, or a library based on a threshold of occurrence in a corpus of samples, the corpus of samples including malware samples;
- generating a dendrogram based on features extracted from the sample source code, the dendrogram representing a collection of samples clustered based on similarity among the samples, the samples including sample clusters belonging to known malware families;
- traversing the dendrogram to identify similarity of an unknown sample to the sample clusters based on a confidence score; and
- identifying anchor point samples from the sample clusters identified as similar to the unknown sample, the anchor point samples to provide metadata for use in extrapolating information to classify the unknown sample.

16. The method of claim 15, further including:
- generating a sequence of adjacent tokenized source code strings based on the feature-extracted sample source code;
- hashing the tokenized source code strings; and
- clustering the hashed source code using a distance metric or a linkage criterion, the dendrogram generated based on the clustering.

17. The method of claim 16, further including extracting application metadata from the source code, the metadata including at least one of an intent, a permission, or file information to be used as a sample feature to detect application functionality.

18. The method of claim 16, further including mapping the confidence score as a parabolic curve using coordinate points of the sample clusters on the dendrogram to sort the sample clusters into discrete confidence intervals.

19. The method of claim 16, wherein the unknown sample is a sample to be classified as a sample of the known malware families, a sample of an emerging malware family, or a benign sample.

20. The method of claim 16, further including identifying a similarity between a first hashed sample and a second hashed sample using the distance metric.

* * * * *